Aug. 16, 1966 R. KREMP ETAL 3,266,397
CAMERA STRUCTURE TO EFFECT ADJUSTMENTS FOR FILM SPEED
AND FILM CARTRIDGES FOR ACTUATING SAID STRUCTURE
Filed June 15, 1964 2 Sheets-Sheet 1
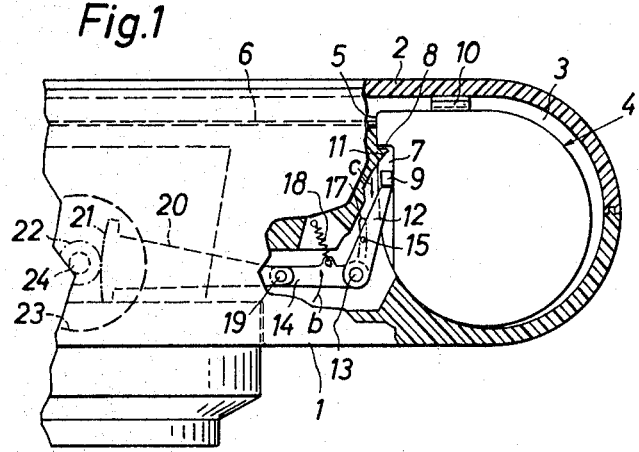
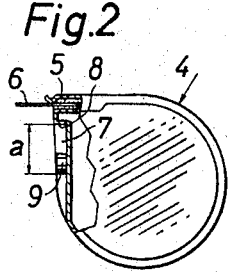
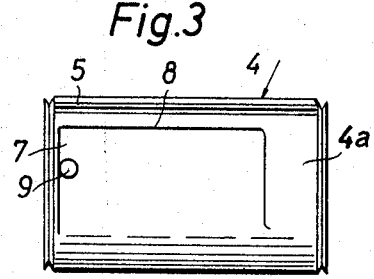
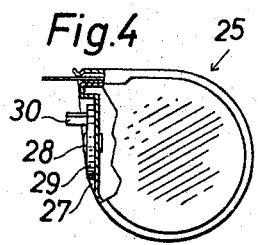
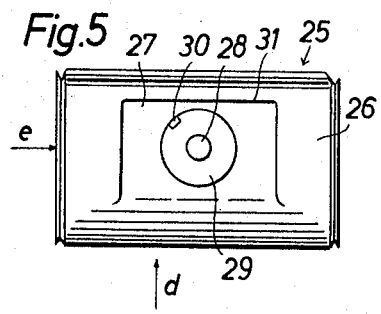
INVENTOR.
RUDOLF KREMP
WILLY KISSELMANN
BY ALFRED WINKLER
KARL BAMMESBERGER
Michael J. Striker
Att.

Aug. 16, 1966 R. KREMP ETAL 3,266,397
CAMERA STRUCTURE TO EFFECT ADJUSTMENTS FOR FILM SPEED
AND FILM CARTRIDGES FOR ACTUATING SAID STRUCTURE
Filed June 15, 1964 2 Sheets-Sheet 2
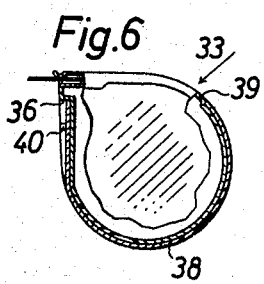
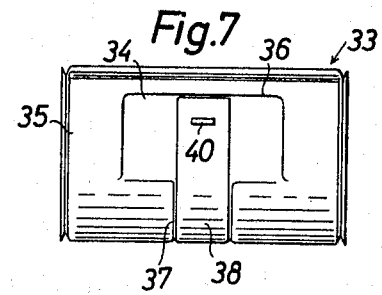
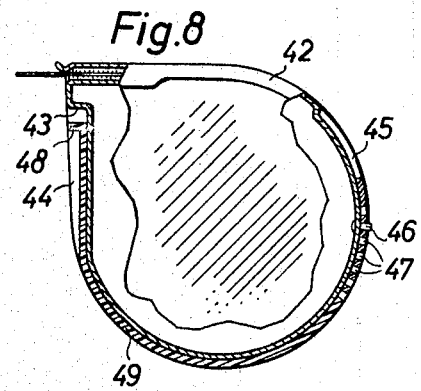
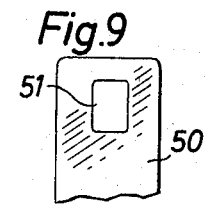
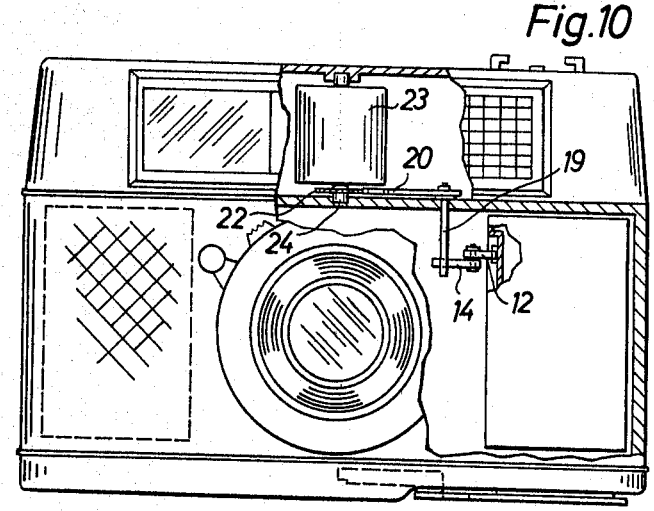
INVENTOR.
RUDOLF KREMP
WILLY KISSELMANN
BY ALFRED WINKLER
KARL BAMMESBERGER
Michael J. Striker

United States Patent Office 3,266,397
Patented August 16, 1966

3,266,397
CAMERA STRUCTURE TO EFFECT ADJUSTMENTS FOR FILM SPEED AND FILM CARTRIDGES FOR ACTUATING SAID STRUCTURE
Rudolf Kremp and Willy, also known as Wilhelm, Kisselmann, Grunwald, Munich, Alfred Winkler, Munich, and Karl Bammesberger, Munich, Untermenzing, Germany, assignors to Agfa Aktiengesellschaft, Leverkusen, Germany
Filed June 15, 1964, Ser. No. 374,948
Claims priority, application Germany, Sept. 30, 1963, A 44,172
19 Claims. (Cl. 95—31)

The present invention relates to cameras.

More particularly, the present invention relates to cameras which have structure to effect adjustments for film speed and to a film cartridge which is adapted to actuate this structure.

As is well known cameras can conventionally be provided with different types of structures to make adjustments for film speed. For example a moving coil instrument, such as a galvanometer, can be supported for rotary movement in its entirety so that by adjusting the angular position of the instrument it is possible to introduce an adjustment for the speed of the film which is used in the camera. Also, it is possible to provide an adjustable cover at the window which receives the light which actuates the light-measuring structure of the camera so that by adjusting such a cover it is possible to adjust the amount of light which is received by the light-measuring structure and in this way also it is possible to effect adjustments for film speed. Furthermore, it is possible to arrange in the electrical circuit of the light-measuring structure a variable resistor which can be adjusted to effect adjustments for film speed.

The present invention relates to cameras which have a structure of this type and to a film cartridge structure which when introduced into the camera will actuate the structure which makes the adjustments for film speed.

One of the objects of the present invention is to provide a film cartridge structure with a means for actuating a camera structure which makes adjustments for film speed, this means being accurately mounted on the cartridge in such a way that the camera structure can be easily actuated thereby with a high degree of precision. Another object of the present invention is to provide for use with a camera structure of the above type a film cartridge construction which makes it unnecessary to store a large number of film cartridges of different constructions according to the different speeds of the film which is housed in these cartridges.

Yet another object of the present invention is to provide for a camera a structure which is capable of effecting adjustments for film speed in an exceedingly simple manner and which at the same time is capable of being actuated by film cartridges constructed according to the present invention.

In particular, it is an object of the present invention to provide for a film cartridge a means which will actuate an adjusting structure of a camera to effect adjustments for film speed, and this means which is carried by the cartridge has in accordance with the invention such a construction that it can be mounted on the completed film cartridge so that all of the film cartridges, irrespective of the speed of the films housed therein, will have the same construction, the only difference being that there is mounted on the completed cartridges a means indicative of the speed of the film therein and capable of actuating a camera structure which will automatically make an adjustment for film speed.

Also, the object of the present invention includes the provision of a simple, reliable, compact camera structure to cooperate with cartridges of the above type for automatically making adjustments for film speed when a cartridge is introduced into the camera.

In particular it is an object of the invention to provide a camera structure where the elements which make the adjustments for film speed are conveniently situated out of the way of all other camera elements in a space which would otherwise be unoccupied.

A further object of the invention is to provide a film cartridge structure where the means which is carried by the cartridge to actuate the camera structure which adjusts for film speed has for cartridges carrying films of different speeds the very same construction, so that this means is identically constructed for all film speeds, the only difference between cartridges housing films of different speeds being that this latter means has different locations on these cartridges, respectively, so that the actuation to bring about an adjustment for film speeds is introduced not by differently constructed elements but only by differently positioned elements.

Yet another object of the present invention is to provide a structure where the elements which are carried by the film cartridge to actuate the structure which makes adjustments for film speed are all identically constructed but can be mounted in different positions on the film cartridge.

The object of the present invention also includes a film cartridge which is provided with a means which cannot be displaced relative to the cartridge to an improper, unintended position, and which actuates the camera structure which makes the adjustments for film speed.

However, the objects of the present invention also include the provision of film cartridges which have adjustable structures which can be moved to positions indicative of film speed so that the same cartridge can be used repeatedly for films of different speeds, the only requirement being that when the cartridge is used for a film speed different from that which was previously used a suitable adjustment be made on structure at the exterior of the cartridge, this latter structure actuating the camera structure which makes the adjustment for film speed when the cartridge is introduced into the camera.

The objects of the present invention also include the provision of a camera structure which will make adjustments for film speed and which has a feeler which is required to move through a relatively great distance in sensing the position of a means which is carried by a film cartridge and which is indicative of film speed, so that in this way because of the relatively large extent of movement of this feeler a particularly high degree of precision in the adjustment can be provided without however requiring an extremely high degree of precision in the manufacture of the parts.

With these objects in view the invention includes a film cartridge which is adapted to be used with the camera which has a structure to effect adjustment for film speed, this cartridge carrying in accordance with the invention a means which actuates the latter camera structure when the cartridge is introduced into the camera so as to automatically make a film speed adjustment simply by introduction of the cartridge into the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly sectional plan view of a camera having structure to effect adjustments for film speed shown in FIG. 1 cooperating with a film cartridge and a means carried thereby to actuate the structure which makes adjustments for film speed;

FIG. 2 is a partly sectional top plan view of one embodiment of a film cartridge according to the invention, this being the embodiment which is used in the illustration of FIG. 1;

FIG. 3 is a side elevation of the cartridge of FIGS. 1 and 2;

FIG. 4 is a partly sectional plan view, taken transversely to the axis of the film cartridge, of the other embodiment of the film cartridge according to the present invention;

FIG. 5 is a side elevation of the cartridge of FIG. 4 as seen from the left of FIG. 4;

FIG. 6 is a partly sectional transverse view of still another embodiment of a cartridge according to the invention;

FIG. 7 is a side elevation of the cartridge of FIG. 6 as seen from the left of FIG. 6;

FIG. 8 is a partly sectional transverse view, on an enlarged scale as compared to the other figures, of still another embodiment of a cartridge according to the present invention;

FIG. 9 is a fragmentary elevation showing a possible variation of part of the structure of FIG. 8 which is used to actuate the camera structure which effects adjustment for film speed; and FIG. 10 is a partly sectional front elevational view of the camera and structure according to FIG. 1.

Referring now to FIGS. 1–3 and 10, there is shown in FIGS. 1 and 10 a camera having a housing 1 and provided with a rear cover 2. Portions of the housing 1 and the rear cover 2 form a cartridge chamber 3 which receives a film cartridge 4 which has an elongated mouth 5 out of which the film strip 6 issues to be guided in a known way for movement in the focal plane. The cartridge 4 is provided, as is particularly apparent from FIGS. 2 and 3, with an exterior surface 4a having a depression 7 formed therein and this depression 7 terminates adjacent to the mouth 5 of the cartridge in an elongated shoulder 8 which extends parallel to the elongated mouth 5 of the film cartridge 4. Situated within the depression 7 is a means for actuating a camera structure which effects adjustments for film speed, and in the example of FIGS. 1–3 this means takes the form of a simple pin 9 fixed to the exterior surface of the cartridge 4 in the depression 7 thereof and projecting from this exterior surface. As is particularly apparent from FIG. 2, the distance $a$ between the shoulder 8 and the side surface portion of the pin 9 which is most distant from this shoulder has a predetermined magnitude, and it is this magnitude of the distance $a$ which is indicative of the speed of the film which is housed within the cartridge 4. This cartridge 4 is of the type which simply houses a coil of film in its interior, and this film is not supported on a rotary film spool. Thus, for film cartridges 4 which house films of different speeds there will be different distances $a$, but otherwise the cartridges are identical, and since the projection 9 can be applied in a manner described below to the cartridge after it is supplied with the unexposed film, it is possible to have all of the cartridges of the same construction, irrespective of the speed of the film to be housed therein, and when film of a given speed is placed in a cartridge it is possible to fix the projection 9 thereto at a given distance $a$ shown in FIG. 2 from the shoulder 8 so as to properly actuate, in a manner described below, the camera structure which makes adjustments for film speed.

The shoulder 8 of the film cartridge is adapted to engage a stationary member 11 of the camera for determining the position of the cartridge in the camera, and the cover 2 carries a leaf spring 10 which engages the cartridge to urge its shoulder against the member 11 when the cover 2 is applied to the camera for closing the latter. Thus, in this way not only is the position of the mouth 5 of the cartridge with respect to film transporting structure of the camera determined, but in addition the position of the means 9 is precisely determined so that structure operated by the means 9 will be precisely actuated. A film transporting structure which cooperates with the film issuing from the mouth 5 of the cartridge transports the film to the region of the exposure aperture where the film will be exposed in a manner well known in the art.

The camera structure which effects adjustment for film speed includes an adjusting means part of which is formed by a feeler lever 12 which is pivotally supported by a pin 13 which is carried by a turnable motion-transmitting lever 14. The lever 12 carries a pin 15 which, in order to provide a movement of the free end of the lever 12 which approaches a straight line as much as possible, extends into an elongated guiding groove 17 formed in a stationary part of the camera, this groove 17 and pin 15 forming a guide means for guiding the lever 12. A spring 18 is connected to the lever 14 for urging the latter to turn in the direction of the arrow $b$, this spring 18 being fixed at its end distant from the lever 14 to any suitable stationary part of the camera, and in this way the spring 18 locates the adjusting means of the camera at an initial position where the free end of the lever 12 is in the path of movement of the projection 9 when the cartridge 4 is introduced into the camera.

When the film cartridge 4 is situated in the camera, as indicated in FIG. 1, the control pin 9 is situated at a lower part of the camera. As may be seen from FIG. 3 control pin 9 is near one end of the cartridge, and this is the lower end thereof when the cartridge is placed in the camera in the manner indicated in FIG. 1. As a result it becomes possible to situate the levers 12 and 14 at an elevation lower than that at which the unillustrated film transporting structure is located, and thus there is no difficulty encountered in positioning these parts in the camera since they occupy a space which would otherwise be unoccupied.

As best seen in FIG. 10, the lever 14 is fixed to a rotary shaft 19 which extends vertically and which is supported for turning movement by any suitable bearings, and adjacent to the upper end of the shaft 19 is fixed to a second lever 20 provided at its outer free end with a toothed sector 21 which meshes with a pinion 22 which is integrally and coaxially fixed with the turnable housing of a galvanometer 23, the latter being mounted together with the pinion 22 on a stationary shaft 24. In this way movement of the feeler lever 12 will be transmitted through the lever 14, the shaft 19, and the lever 20 as well as the sector 21 and the pinion 22 to the galvanometer 23 so as to adjust the latter for film speed.

When the cartridge is introduced into the camera the pin 9 will engage the free end of the feeler lever 12 and will move the latter in the direction of the arrow $c$. This will result in turning of the lever 14 in a direction opposite to that indicated by the arrow $b$. This turning is transmitted through the shaft 19 and lever 20 to the instrument 23 so as to adjust the latter to take into account the speed of the film which is used in the camera. Of course, the distance $a$ as shown in FIG. 2 is indicative of the speed of the particular film which is housed within the cartridge 4. When the cartridge is removed from the camera the spring 18 returns the adjusting structure, which makes the adjustments for film speeds, to its starting position.

The cartridge 25 shown in FIGS. 4 and 5 has an exterior surface 26 provided with a depression 27, and within this depression 27 is located a pin 28 which supports disc 29 for rotary movement, the pin 28 providing a high degree of frictional resistance to the turning of the disc 29 so that the latter will reliably remain in whatever angular position it is moved to by the operator. This disc 29 carries at its periphery a lug 30 which extends in a direction parallel to the pin 28 away from the exterior surface of the cartridge, and it is this pin 30 which forms the means indicative of the film speed and engaging the feeler 12 or the like to actuate the camera structure which makes the adjustments for film speed. Of course, in this case the lever 12 is located at a suitable elevation to cooperate with the pin 30 and the frictional resistance to turning of the disc 29 is great enough to prevent any movement of the pin 30 while it actuates the adjusting structure of the camera. With the embodiment of FIGS. 4 and 5 it is possible for the operator to place the disc 29 in an angular position which situates the pin 30 at a location indicative of the film speed, this location being determined by the distance of the pin 30 from the shoulder along that end of the depression 27 which is nearest to and extends parallel to the mouth of the cartridge 25, in the same way as was described above in connection with FIGS. 1-3. Thus, it will be seen that the shoulder 31 (FIG. 5) extends parallel to the mouth of the cartridge 25. The advantage of the structure of FIGS. 4 and 5 is not only that all of the film cartridges will have identical constructions and can be adjusted in accordance with the film which is placed therein so that when the same cartridge is used over and over it can accommodate films of different film speeds, but in addition the lug 30 can be sensed by a feeler which moves not only in the direction of the arrow *d*, as is the case with the feeler 12 of FIG. 1, but also with a feeler which moves in the direction of the arrow *e* or in a direction opposite to that indicated by the arrow *e* as well as in a direction opposite to that indicated by the arrow *d*, so that this construction can be used with all types of adjusting structures irrespective of the direction in which the feelers thereof move.

Instead of being provided with a projection 30 it is possible for the disc 29 to have at its periphery a camming portion of suitable configuration for engaging a feeler lever, and this camming portion can, for example, be in the form of a portion of the periphery of the disc 29 which extends radially with respect to the axis of turning thereof.

The film cartridge 33 of FIGS. 6 and 7 has an exterior surface 35 which is formed not only with a depression 34 which is limited at one end by the elongated shoulder 36 which extends parallel to and is located adjacent the mouth of the cartridge, as was the case with the other embodiments, but in addition this surface 35 is formed with a circumferentially extending depression 37 which communicates with and extends from the depression 34 around the cartridge, which is of generally cylindrical configuration, up to an end 39 of the depression 37, this end 39 forming a second shoulder which extends parallel to the shoulder 36. A springy clip 38, made of metal, for example, is situated within and extends along the depression 37 and thus extends part of the way around and clamps itself onto the cartridge so as to be carried thereby. The length of the clip 38 is such that one of its ends engages the shoulder 36 while the other of its ends engages the shoulder 39, and the clip 38 is provided with a raised portion 40 which is adapted to be engaged by a feeler in the manner described above. Thus, in this embodiment it is the springy clip 38 and its raised portion 40 which forms the means for actuating the camera structure which makes the adjustments for film speed.

With this embodiment it is a simple matter to remove the clips 38 from a cartridge and to replace a clip 38 with another clip when a film of a different film speed is introduced into the cartridge. All of the clips 38 are of the same length but the distance of the raised portion 40 from the ends of the clip, and thus from the end of the shoulders 36 and 39 will be different depending upon the particular speed of the film, so that after a film of a given speed is situated within the cartridge a clip 38 having a raised portion 40 thereon corresponding to the speed of the film in the cartridge can be snapped into the depressed portion 37 so as to have a structure such as that shown in FIGS. 6 and 7.

The embodiment of FIG. 8 shows a film cartridge 42 which is also formed at its exterior surface with a depression 44 limited adjacent to the mouth of the cartridge by an elongated shoulder 43 extending parallel to the axis of the cartridge and of course to the mouth thereof, and in addition the exterior surface of the cartridge 42 has an elongated circumferential depression 45. In the circumferential depression 45, at a side of the cartridge opposite from its depressed portion 44, the cartridge 42 fixedly carries a pin 46. With this embodiment use is made of an elongated springy clip 49 similar to the clip 38 except that the clip 49 is formed adjacent its right end, as viewed in FIG. 8 with a row of openings 47 which extend longitudinally of the clip 49. At its opposite end, which is adjacent the shoulder 43, the clip 49 has an outwardly directed lug 48 forming a control projection whose distance from the shoulder 43 will of course be indicative of the speed of the film which happens to be in the cartridge. According to the particular speed of the film which has been placed in the cartridge 42, the operator will select one of the openings 47 to receive the pin 46 when the clip 49 is mounted on the cartridge in the depression 45 thereof, and in this way the distance between the projection 48 and the shoulder 43 will be regulated in accordance with the film speed. Thus, with this embodiment also it is possible to have identical structures for films of different film speeds inasmuch as the clip 49 can be mounted on the cartridge in a position according to the speed of the film. Therefore, only one type of cartridge and only one type of means for actuating the adjusting structure of the camera need be used.

Of course, it is also possible with the embodiment of FIGS. 8 and 9 to provide only a single opening 47 in the clip 49 which makes such a clip useful for only one film speed, and in this case the operator will select for a given cartridge a clip which has its opening 47 spaced from the projection 48 by a distance which is indicative of the particular speed of the film which happens to be in the cartridge, and then such a clip will be mounted on the cartridge.

With the embodiments of FIGS. 6-8 the clips have raised or projecting portions which are adapted to be engaged by the feeler of the camera structure which makes the adjustments for film speed, but it will be seen that all that is required is that the clip 49 has at its exterior surface a control portion which extends from the exterior surface in a direction which will enable a feeler to detect the control portion. Thus, instead of a structure which extends outwardly away from the exterior surface of the clip, as shown in FIGS. 6-8, the control portion can have the construction extending inwardly from the exterior surface of the clip, and such a control portion can be in the form of a simple opening in the clip. Thus, FIG. 9 shows a clip 50 having an opening 51 which provides a means capable of being detected by a feeler of a structure for making an adjustment for film speed.

It should be noted that the projection 9 of FIGS. 1-3 can be mounted on the exterior surface of the cartridge by being glued thereto or by being fused thereto, in the case where suitable plastic materials are used for the cartridge and the control pin 9. Moreover, it is apparent that this mounting of the pin 9 on the cartridge can take place after the film is placed in the cartridge so that the position of the pin can be determined according to the speed of the film after the film has been placed in the cartridge.

It is to be noted that with the embodiment of FIG. 1 the feeler element moves through a relatively large distance so that in this way an extremely accurate adjustment for the film speed can be provided without requiring the parts themselves to have an expensive, extremely precise construction.

It will be understood that each of the elements described above, or two or more together, may also find a useful application in other types of cameras differing from the types described above.

While the invention has been illustrated and described as embodied in structures for adjusting for film speed, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A film cartridge having in combination an elongated mouth through which the film is adapted to pass between the interior and the exterior of said cartridge along a path located in a predetermined plane, an exterior surface portion located substantially in a plane transverse to said predetermined plane and to said path, a first outwardly projecting projection carried by said cartridge at said external surface portion thereof and including a positioning surface portion, and a second outwardly projecting projection carried by said cartridge at said exterior surface portion thereof and having an actuating surface portion, the distance between said positioning surface portion of said first projection and said actuating surface portion of said second projection being indicative of the speed of the film which is in said cartridge.

2. A film cartridge having in combination an elongated mouth through which the film is adapted to pass between the interior and the exterior of said cartridge along a path located in a predetermined plane, and an exterior surface portion located substantially in a plane transverse to said predetermined plane and to said path and formed with a first projection including a positioning surface portion, and with a second projection projecting outwardly from said exterior surface portion of said cartridge and having an actuating surface portion, the distance between said positioning surface portion of said first projection and said actuating surface portion of said second projection being indicative of the speed of the film which is in said cartridge.

3. In an assembly for making photographs, in combination, a camera having a housing carrying an adjusting means to effect adjustments for film speed, said adjusting means including a movable feeler; and a film cartridge adapted to be placed in said camera and to have a predetermined position therein, said cartridge having an elongated mouth through which the film is adapted to pass between the interior and the exterior thereof along a path located in a predetermined plane and an exterior surface portion located substantially in a plane transverse to said predetermined plane and to said path, a first projection projecting outwardly from said outer surface portion and including a positioning surface portion, and a second projection projecting outwardly from said exterior surface portion of said cartridge and having an actuating surface portion for actuating said adjusting means to automatically make an adjustment for film speed when said cartridge is introduced into said camera, said actuating means being located in the path of movement of said feeler to be engaged thereby for determining the adjustment made by said adjusting means, said positioning surface portion engaging a fixed portion of said housing when said cartridge is in said predetermined position, and the distance between said actuating surface portion of said cartridge and said positioning surface portion of said said cartridge being indicative of the speed of the film in said cartridge and determining the amount of movement of said feeler.

4. The combination of claim 3 and wherein said feeler moves in a plane parallel to an end of said cartridge when the latter is in said camera.

5. The combination of claim 4 and wherein said feeler is situated at an elevation lower than structure for transporting film in the camera.

6. The combination of claim 3 and wherein said feeler moves in a direction parallel to the longitudinal axis of said cartridge when the latter is in said camera.

7. In an assembly for making photographs, in combination, a camera; a film cartridge adapted to be introduced into said camera and to have a predetermined position therein, said cartridge having an elongated mouth through which the film is adapted to pass between the interior and the exterior thereof along a path located in a predetermined plane, and an outer surface portion located substantially in a plane transverse to said predetermined plane and to said path, a first projection projecting outwardly from said outer surface portion and including a positioning surface portion; and said cartridge carrying a second projection including a control portion which moves along a given path during introduction of said cartridge into said camera, and said second projection being carried by said cartridge also at said outer surface portion thereof which latter is situated in a given plane when said cartridge is in said camera, the distance between said control portion and said positioning surface portion of said first projection being indicative of the speed of the film in said cartridge; a feeler lever located in said camera in the path of movement of said second projection to be engaged and moved by said control portion when the cartridge is introduced into the camera; guide means carried by said camera and guiding said feeler lever when it is moved by said projection in a direction substantially parallel to said plane; a motion transmitting lever turnably carried by said camera and pivotally carrying said feeler lever, said levers forming part of a structure for effecting adjustments for film speed; spring means operatively connected to one of said levers for urging said feeler lever at one end thereof against said projection and stationary locating means carried by said camera and engaging said positioning surface portion of said first projection when said cartridge is in said predetermined position in said camera.

8. A film cartridge having in combination, an elongated mouth through which the film is adapted to pass between the interior and the exterior of said cartridge, and an exterior surface formed with a depression terminating at one end in an elongated shoulder at the exterior of the cartridge, said shoulder being substantially in a plane which is parallel to said mouth, and a projection carried by said cartridge at the exterior thereof and in said depression, the distance between said shoulder and said projection being indicative of the speed of the film which is in said cartridge.

9. For use with a camera having a structure for effecting adjustments for film speed, in combination, a film cartridge adapted to contain film of a given film speed and adapted to be placed in said camera, said cartridge having an elongated mouth through which the film is adapted to pass between the interior and the exterior thereof along a path located in a predetermined plane, and an outer surface portion located substantially in a plane transverse to said predetermined plane and to said path, a first projection projecting outwardly from said outer surface portion and including a positioning surface portion; and a spring clip resiliently engaging and carried by said cartridge, said clip extending part of the way around said cartridge, and said clip having an exterior surface and having a control portion extending from said exterior surface thereof in the region of said outer surface portion of said cartridge for actuating said structure to automatically maintain adjustment for film speed when the cartridge is introduced into said camera, the distance between said control portion and said positioning surface portion of said first projection being indicative of the speed of the film in said cartridge.

10. The combination of claim 9 and wherein said control portion extends inwardly from said exterior surface of said clip and is in the form of an opening which is formed in said clip.

11. The combination of claim 9 and wherein said control portion is in the form of a projection projecting outwardly from said exterior surface of said clip.

12. The combination of claim 7, wherein said film cartridge has a predetermined axis and has at its exterior a pair of elongated shoulders extending parallel to said axis and circumferentially spaced from each other with respect to said axis, one of said shoulders being adapted to engage a stationary camera member for determining the position of the cartridge in the camera, and wherein said elongated spring clip extends between and has opposed ends respectively engaging said shoulders, and wherein said clip carries at its exterior a means for actuating said structure to automatically make an adjustment for film speed when the cartridge is introduced into the camera, said means being spaced from said shoulders by distances which are indicative of the speed of film which is in said cartridge.

13. A combination of claim 12 and wherein said clip is formed adjacent said one end thereof with a row of said openings extending longitudinally of said clip so that one of said openings can selectively receive said pin to determine the distance between said pin and said control portion, the selected opening which receives said pin having a distance from said control portion which is indicative of the speed of the film in the cartridge.

14. The combination according to claim 9, wherein said film cartridge is of generally cylindrical configuration, said cartridge fixedly carrying a pin at the exterior of said cartridge at a predetermined circumferential distance from said first projection; and said spring clip having adjacent one end thereof an opening which receives said pin, said control portion being located adjacent the opposite end thereof, whereby the distance between said opening and said control portion is indicative of the speed of the film which is in said cartridge.

15. For use with a camera which has a structure to effect adjustments for film speed, in combination, a film cartridge adapted to be placed in the camera, said cartridge having an elongated mouth through which the film is adapted to pass between the interior and the exterior thereof along a path located in a predetermined plane, and an outer surface portion located substantially in a plane transverse to said predetermined plane and to said path, a first projection projecting outwardly from said outer surface portion and including a positioning surface portion; and a disc carried by said cartridge at said outer surface portion thereof for turning movement to selected angular positions, said disc having a control portion which actuates said structure to automatically make an adjustment for film speed when the cartridge is introduced into the camera, and the position of said control portion with respect to said positioning surface portion of said first projection determining the adjustment for film speed according to the selected angular position of said disc.

16. The combination of claim 15 and wherein said control portion is in the form of a projection fixed to and projecting from said disc.

17. The combination of claim 15 and wherein said control portion is in the form of a camming edge of said disc.

18. A film cartridge having in combination an elongated mouth through which the film is adapted to pass between the interior and the exterior of said cartridge along a path located in a predetermined plane, and an exterior surface portion located substantially in a plane transverse to said predetermined plane and formed with an elongated shoulder at the exterior of the cartridge, said shoulder including a positioning surface portion located in a plane which is substantially parallel to said predetermined plane, and a projection carried by said cartridge at the exterior surface portion thereof, said projection projecting outwardly from said exterior surface portion of said cartridge in a direction substantially parallel to said film path, the distance between said positioning surface portion of said shoulder and said projection being indicative of the speed of the film which is in said cartridge.

19. A film cartridge having in combination a substantially cylindrical portion provided with an elongated mouth through which the film is adapted to pass between the interior and the exterior of said cartridge along a path located in a predetermined plane, and a substantially flat portion in the region of the mouth and extending in a plane which is substantially normal to the direction of said path, and an elongated shoulder located at the exterior of the cartridge intermediate said mouth and said flat portion, said shoulder having a surface portion located in a plane which is substantially parallel to said predetermined plane, and a projection carried by said cartridge at said flat portion thereof and projecting outwardly from said cartridge in a direction substantially parallel to said film path, the distance between such surface portion of said shoulder and said projection being indicative of the sensitivity of the film which is in said cartridge.

References Cited by the Examiner

UNITED STATES PATENTS

| | | | |
|---|---|---|---|
| 2,043,901 | 6/1936 | Mihalyi | 95—10 X |
| 2,080,055 | 5/1937 | Martin | 95—10 X |
| 2,186,611 | 1/1940 | Martin. | 95—10 X |
| 2,186,613 | 1/1940 | Mihalyi. | |
| 2,367,195 | 1/1945 | Bolsey | 95—31 |
| 2,493,928 | 1/1950 | Rath | 95—10 |
| 3,025,777 | 3/1962 | Wilkenson | 95—31 X |
| 3,159,357 | 12/1964 | Berlings | 95—31 X |
| 3,194,133 | 7/1965 | Benson | 95—31 X |

FOREIGN PATENTS

| | | |
|---|---|---|
| 456,782 | 7/1944 | Belgium. |
| 456,783 | 7/1944 | Belgium. |

NORTON ANSHER, *Primary Examiner.*

EVON C. BLUNK, *Examiner.*